US012775201B2

(12) United States Patent
Onishi

(10) Patent No.: US 12,775,201 B2
(45) Date of Patent: Oct. 27, 2026

(54) OPTICAL PATH CHANGING DEVICE AND PROJECTION IMAGE DISPLAY DEVICE PROVIDED WITH SAME

(71) Applicant: Panasonic Intellectual Property Management Co., Ltd., Osaka (JP)

(72) Inventor: Hideo Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 193 days.

(21) Appl. No.: 18/894,739

(22) Filed: Sep. 24, 2024

(65) Prior Publication Data

US 2025/0013137 A1 Jan. 9, 2025

Related U.S. Application Data

(63) Continuation of application No. PCT/JP2022/043136, filed on Nov. 22, 2022.

(30) Foreign Application Priority Data

Mar. 30, 2022 (JP) ................................ 2022-056981

(51) Int. Cl.
*G03B 21/14* (2006.01)

(52) U.S. Cl.
CPC .................................. *G03B 21/147* (2013.01)

(58) Field of Classification Search
CPC ..... G03B 21/142; G03B 21/147; G03B 21/14
See application file for complete search history.

(56) References Cited

U.S. PATENT DOCUMENTS

| | | | |
|---|---|---|---|
| 2007/0109412 A1 | 5/2007 | Hara | |
| 2016/0306269 A1 | 10/2016 | Gyoten et al. | |
| 2020/0174246 A1 | 6/2020 | Wakabayashi et al. | |

FOREIGN PATENT DOCUMENTS

| | | |
|---|---|---|
| JP | 2007-139965 | 6/2007 |
| JP | 2020-91343 | 6/2020 |
| WO | 2015/098120 | 7/2015 |

OTHER PUBLICATIONS

International Search Report issued in International Application No. PCT/JP2022/043136 on Jan. 31, 2023, with English translation.

(Continued)

*Primary Examiner* — Ryan D Howard
(74) *Attorney, Agent, or Firm* — Wenderoth, Lind & Ponack, L.L.P.

(57) ABSTRACT

An optical path changing device includes: an optical member, a first support member that supports the optical member; a second support member that supports the first support member swingably about a first swing center line; a base member that supports the second support member swingably about a second swing center line; a first actuator that is disposed on one side with respect to the first swing center line and swings the first support member; and a second actuator that is disposed on one side with respect to the second swing center line and swings the second support member. The first swing center line is shifted toward the first actuator with respect to a shape center of the optical member at between the shape center of the optical member and the first actuator, or the second swing center line is shifted toward the second actuator with respect to the shape center of the optical member at between the shape center of the optical member and the second actuator.

11 Claims, 10 Drawing Sheets

(56) References Cited

OTHER PUBLICATIONS

International Preliminary Report on Patentability issued Oct. 10, 2024 in International Application No. PCT/JP2022/043136, with English translation.

OPTICAL PATH CHANGING DEVICE AND PROJECTION IMAGE DISPLAY DEVICE PROVIDED WITH SAME

CROSS REFERENCE TO RELATED APPLICATIONS

This application is a continuation of PCT Application No. PCT/JP2022/043136, filed Nov. 22, 2022, which claims priority to Japanese Patent Application No. 2022-056981, filed Mar. 30, 2022, the entire contents of each of which are hereby incorporated in their entirety.

TECHNICAL FIELD

The present disclosure relates to an optical path changing device that drives an optical member to shift a projection position of image light, and to a projection image display device including the optical path changing device.

BACKGROUND ART

For example, WO 2015/098120 A1 discloses an optical path changing device that is mounted on a projection image display device and shifts an image reflected on a screen by changing an orientation of an optical member through which image light passes.

SUMMARY

Problems to be Solved by the Invention

However, in the case of WO 2015/098120 A1, four actuators are used to change the orientation of the optical member. Therefore, during the change of the orientation of the optical member, a high level of noise derived from the actuator is generated.

Therefore, an object of the present disclosure is to reduce a level of a noise generated when changing an orientation of an optical member in an optical path changing device of a projection image display device.

In order to solve the above technical problems, according to an aspect of the present invention, provided is an optical path changing device including:

- an optical member;
- a first support member that supports the optical member;
- a second support member that supports the first support member swingably about a first swing center line extending in a direction intersecting a propagation direction of light incident on the optical member;
- a base member that supports the second support member swingably about a second swing center line that extends in a direction intersecting the propagation direction and is different from the first swing center line;
- a first actuator that is disposed on one side with respect to the first swing center line as viewed in the propagation direction and swings the first support member; and
- a second actuator that is disposed on one side with respect to the second swing center line as viewed in the propagation direction and swings the second support member,
- wherein as viewed in the propagation direction, the first swing center line is shifted toward the first actuator with respect to a shape center of the optical member at between the shape center of the optical member and the first actuator, or as viewed in the propagation direction, the second swing center line is shifted toward the second actuator with respect to the shape center of the optical member at between the shape center of the optical member and the second actuator.

According to another aspect of the present invention, provided is an optical path changing device including:

- an optical member;
- a support member that supports the optical member;
- a base member that supports the support member swingably about a swing center line that extends in a direction intersecting a propagation direction of light incident on the optical member; and
- an actuator that is disposed on one side with respect to the swing center line as viewed in the propagation direction and swings the support member,
- wherein as viewed in the propagation direction, the swing center line is shifted toward the actuator with respect to a shape center of the optical member at between the shape center of the optical member and the actuator.

According to a different aspect of the present invention, provided is a projection image display device including:

- the above-described optical path changing device;
- a light source; and
- an optical modulation module that converts light from the light source into image light and emits the image light toward the optical member of the optical path changing device.

With the present disclosure, in the optical path changing device of the projection image display device, it is possible to reduce the level of the noise generated when the orientation of the optical member is changed.

DETAILED DESCRIPTION

Hereinafter, embodiments according to the present disclosure will be described with reference to the drawings. However, unnecessarily detailed description is omitted in some cases. For example, detailed description of already well-known matters and repeated description of substantially the same configuration may be omitted. This is to prevent the following description from being unnecessarily redundant and to allow a person skilled in the art to easily understand the present disclosure.

Note that the accompanying drawings and the following description are provided for those skilled in the art to fully understand the present disclosure, and are not intended to limit the subject matter described in the claims.

Hereinafter, an optical path changing device and a projection image display device according to an embodiment of the present disclosure will be described with reference to the drawings.

Figure 1:
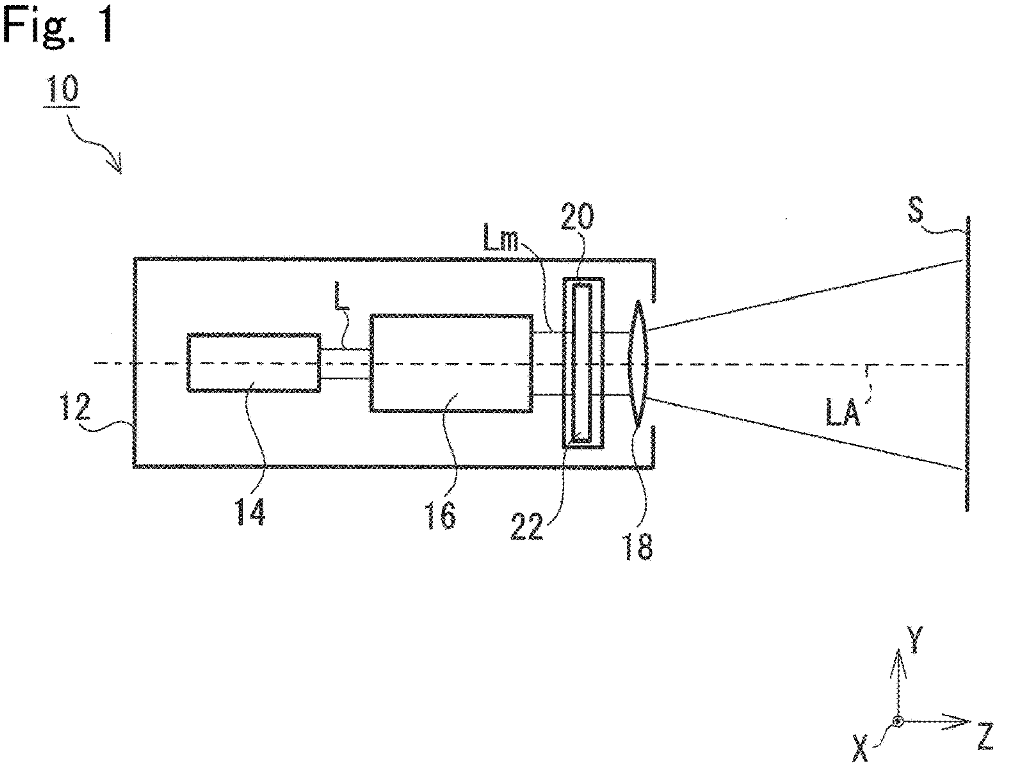
FIG. 1 is a schematic configuration diagram of an example of a projection image display device equipped with an optical path changing device according to an embodiment of the present disclosure.

FIG. 1 is a schematic configuration diagram of an example of a projection image display device equipped with an optical path changing device according to an embodiment of the present disclosure. Note that an X-Y-Z orthogonal coordinate system illustrated in FIG. 1 is for facilitating understanding of the embodiment of the present disclosure, and does not limit the present disclosure. In the X-Y-Z orthogonal coordinate system, an X-axis direction represents a width direction of an image projected by the projection image display device, a Y-axis direction represents a height direction of the image, and a Z-axis direction represents a projection direction of the projection image display device.

As illustrated in FIG. 1, a projection image display device 10 is a so-called projector, and includes: a casing 12; a light source 14; an optical modulation module 16 that converts light L from the light source 14 into image light Lm on the basis of image data; and a projection lens 18 that projects the image light Lm onto a screen S. The optical modulation module 16 is configured with, for example, a plurality of digital micromirror devices (DMDs) (not illustrated) and a total internal reflection prism (TIR prism) (not illustrated). Note that, in the present disclosure, the optical modulation module that converts the light L into the image light Lm is not limited.

The projection image display device 10 also includes an optical path changing device 20. The optical path changing device 20 includes an optical member 22 disposed between the optical modulation module 16 and the projection lens 18.

Note that the projection image display device 10 includes optical members (not illustrated) such as mirrors, prisms, and filters between the light source 14 and the optical modulation module 16 and between the optical modulation module 16 and the optical member 22 of the optical path changing device 20.

In the projection image display device 10, the optical modulation module 16 converts the light L from the light source 14 into the image light Lm, and emits the image light Lm toward the optical member 22 of the optical path changing device 20. The image light Lm passes through the optical member 22 and the projection lens 18, and is projected on the screen S. As a result, an image is displayed on the screen S.

Figure 2:
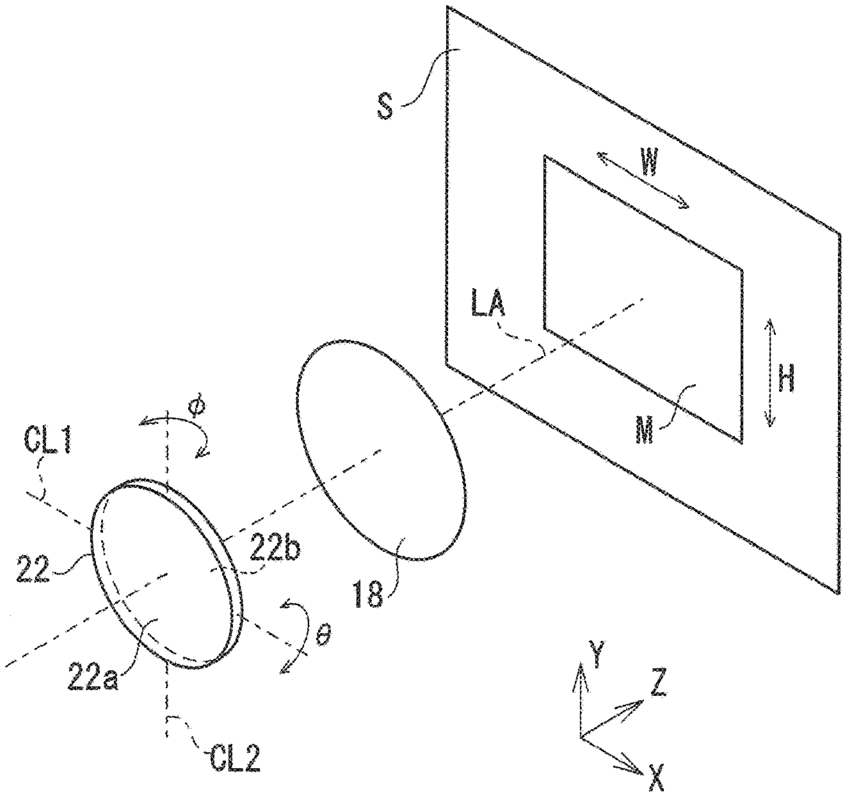
FIG. 2 is a diagram for describing driving of an optical member by the optical path changing device.

FIG. 2 is a diagram for describing driving of the optical member by the optical path changing device.

As illustrated in FIG. 2, the optical member 22 of the optical path changing device 20 is located between the optical modulation module 16 and the projection lens 18, and includes: an incident surface 22*a* on which the image light Lm from the optical modulation module 16 is incident; and an emission surface 22*b* from which the image light Lm is emitted toward the projection lens 18. The incident surface 22*a* and the emission surface 22*b* are planes parallel to each other.

The optical path changing device 20 drives the optical member 22 such that the optical member 22 swings about a first swing center line CL1 extending in a direction (X-axis direction in the case of the present embodiment) intersecting a propagation direction (Z-axis direction in the case of the present embodiment) of the image light Lm incident on the optical member 22. In addition, the optical path changing device 20 drives the optical member 22 such that the optical member 22 swings about a second swing center line CL2 that extends in a direction (Y-axis direction in the case of the present embodiment) intersecting the propagation direction of the image light Lm incident on the optical member 22 and is different from the first swing center line CL1. Being driven as described above, an orientation of the optical member 22 is changed. Note that in the case of the present embodiment, the propagation direction of the image light Lm incident on the optical member 22 is an extending direction of an optical axis LA of the projection lens 18. As viewed in the propagation direction, the first swing center line CL1 and the second swing center line CL2 are orthogonal to each other.

When the optical path changing device 20 drives the optical member 22, an image M projected on the screen S is shifted within a stroke range of ½ pixels in each of a width direction W (X-axis direction) and a height direction H (Z-axis direction) of the screen S. In the case of the present embodiment, when the optical member 22 swings about the first swing center line CL1, the image M reciprocates in the height direction H. Furthermore, when the optical member 22 swings about the second swing center line CL2, the image M reciprocates in the width direction W.

By driving the optical member 22, the image M is projected on the screen S in the following order. The image M that is +¼ pixels shifted in the width direction and +¼ pixels shifted in the height direction from a reference position, the image M that is +¼ pixels shifted in the width direction and −¼ pixels shifted in the height direction from the reference position, the image M that is −¼ pixels shifted in the width direction and −¼ pixels shifted in the height direction from the reference position, and the image M that is −¼ pixels shifted in the width direction and +¼ pixels shifted in the height direction from the reference position. Note that the reference position is a position when the optical member 22 is not driven (that is, in a stopped state), and is a position when the image light Lm from the optical modulation module 16 is perpendicularly incident on the incident surface 22*a* of the optical member 22. As a result, the image M is displayed on the screen S with a resolution higher than that of an original image data.

In order to increase the resolution of the image M on the screen S as described above, the optical path changing device 20 needs to drive the optical member 22 at a high speed. For that purpose, the optical path changing device 20 has the following configuration.

Figure 3:
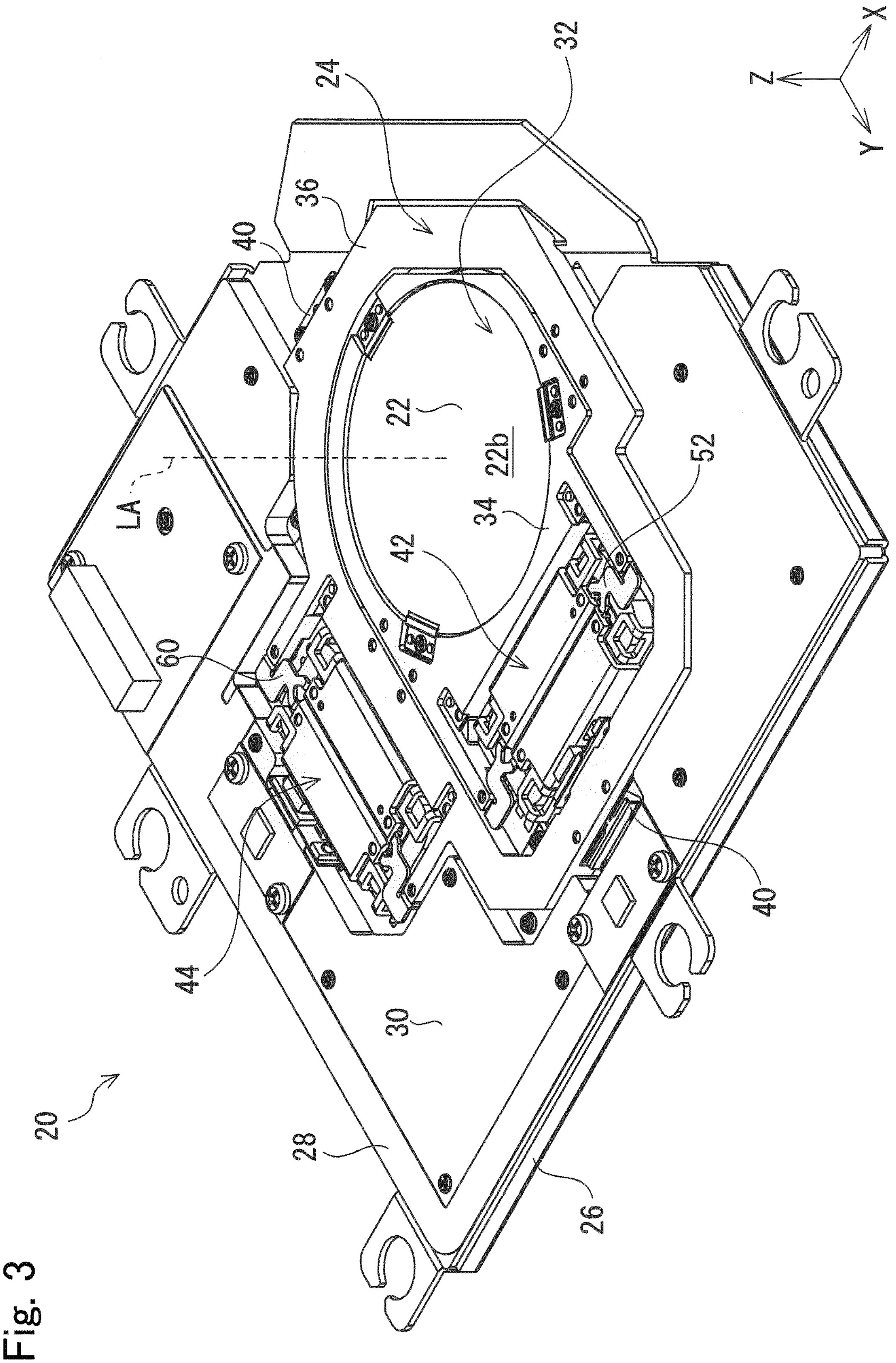
FIG. 3 is a perspective view of the optical path changing device.
Figure 4:
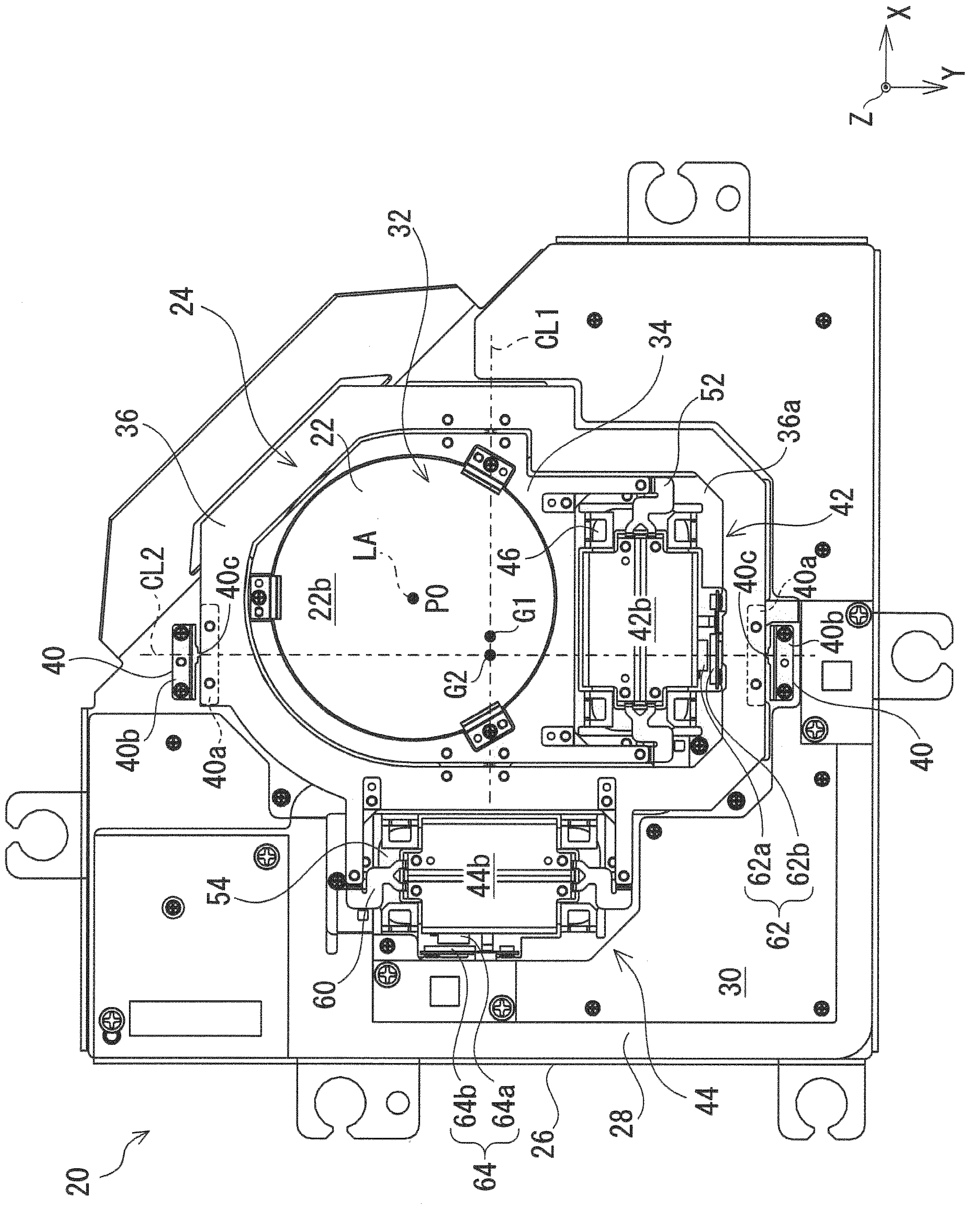
FIG. 4 is a top view of the optical path changing device.

FIG. 3 is a perspective view of the optical path changing device. Furthermore, FIG. 4 is a top view of the optical path changing device. In addition, FIG. 5 is an exploded perspective view of the optical path changing device.

Figure 5:
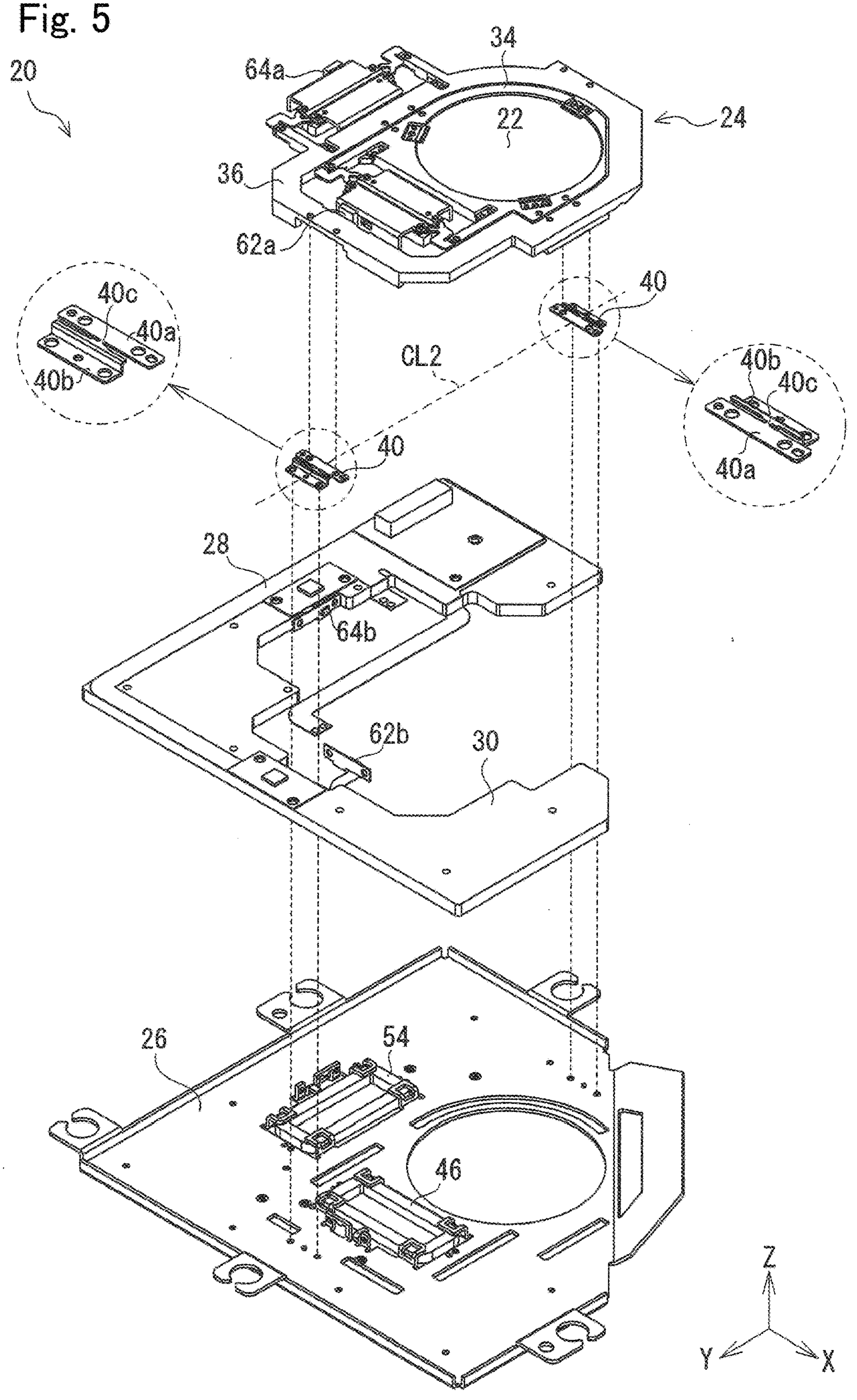
FIG. 5 is an exploded perspective view of the optical path changing device.

As illustrated in FIGS. 3 to 5, the optical path changing device 20 includes: a main unit 24 that supports the optical member 22; and a base member 26 that rotatably supports the main unit 24. In the case of the present embodiment, the optical path changing device 20 includes a flexible printed circuit board 28 and a spacer member 30 that supports the flexible printed circuit board 28.

As illustrated in FIGS. 3 and 4, in the case of the present embodiment, the optical member 22 is a disk-shaped member made of a transparent parallel glass plate. When the optical member 22 is in a reference orientation, the image light Lm from the optical modulation module 16 is perpendicularly incident on the incident surface 22*a* of the optical member 22. In addition, when the optical member 22 is in the reference orientation, a shape center P0 of each of the incident surface 22*a* and the emission surface 22*b* is located on the optical axis LA of the projection lens 18, and each of the incident surface 22*a* and the emission surface 22*b* is orthogonal to the optical axis LA. When the optical member 22 is in the reference orientation, the image M on the screen S is located at the reference position.

The main unit 24 is a unit that is configured with a plurality of members and supports the optical member 22.

Figure 6:
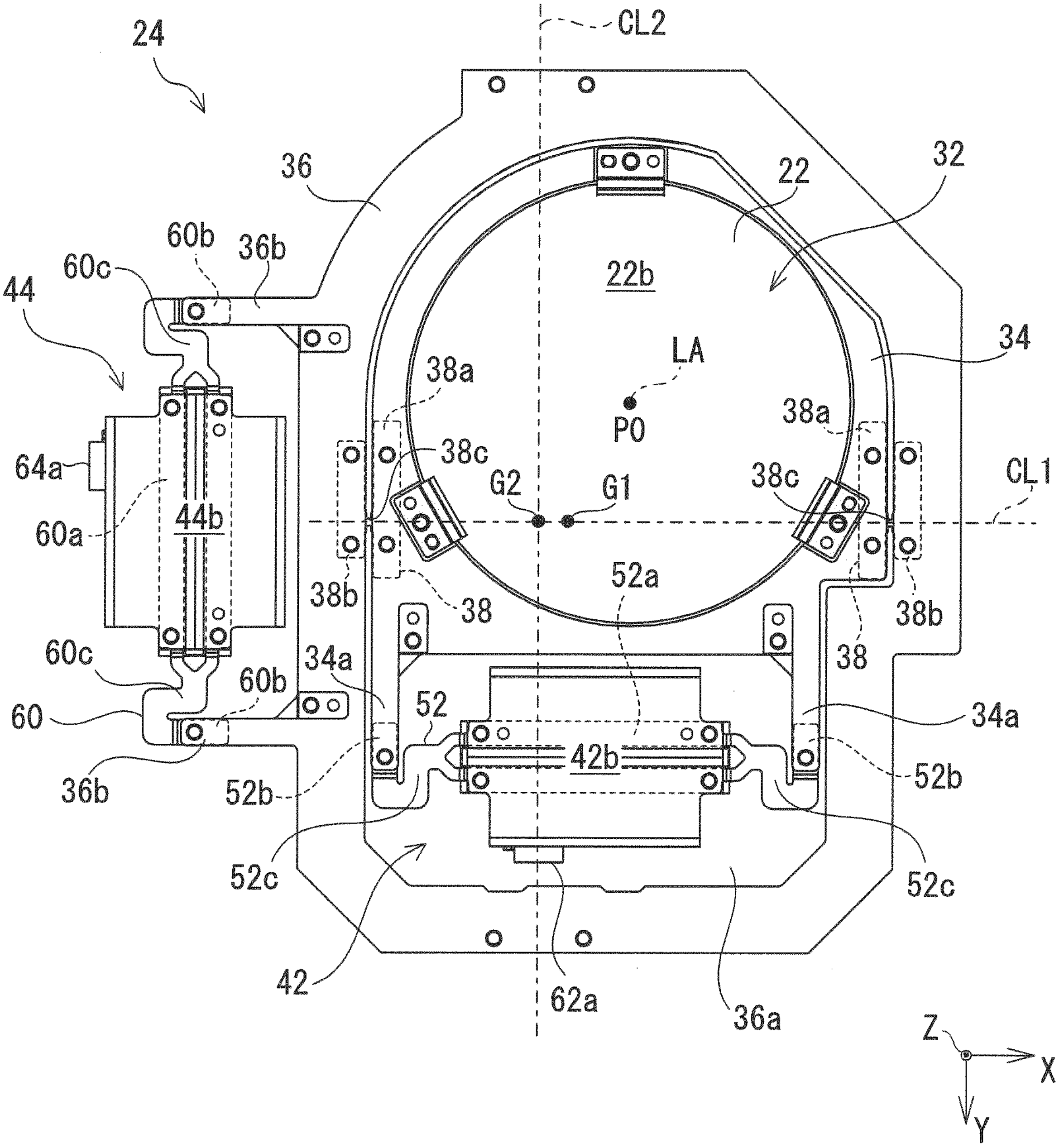
FIG. 6 is a top view of a movable unit.

FIG. 6 is a top view of the main unit. Furthermore, FIG. 7 is an exploded perspective view of the main unit.

The main unit 24 includes a subunit 32. The subunit 32 includes a first support member 34 that supports the optical member 22.

Figure 7:
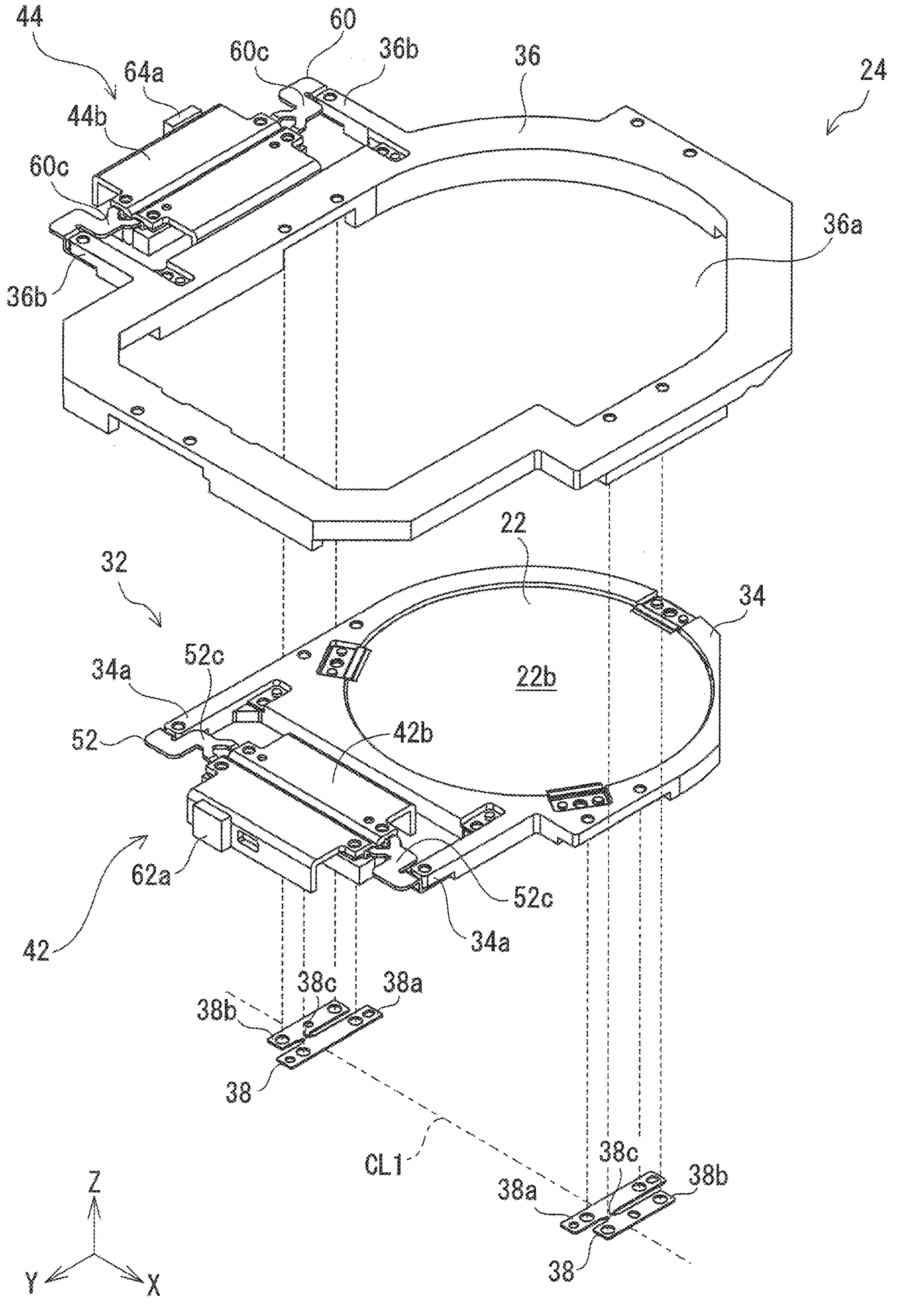
FIG. 7 is an exploded perspective view of the movable unit.

As illustrated in FIGS. 6 and 7, in the case of the present embodiment, the first support member 34 is a frame-shaped member that supports an outer edge portion of the optical member 22. Note that the first support member 34 may have any shape as long as the first support member 34 can support the optical member 22. For example, the first support member 34 may have a "U" shaped.

The main unit 24 also includes a second support member 36 that swingably supports the subunit 32 about the first swing center line CL1.

In the case of the present embodiment, the second support member 36 is a frame-shaped member and includes a through-hole 36*a* that accommodates the subunit 32. Furthermore, the second support member 36 has a thickness (size in the Z-axis direction) substantially equal to a thickness of the subunit 32. As a result, a thickness of the main unit 24 is made thin. As a result, the optical path changing device 20 is made thin, so that it is possible to make small a length of a space that is between the optical modulation module 16 and the projection lens 18 and in which the optical path changing device 20 is disposed. Note that the second support member 36 may have any shape as long as the second support member 36 can swingably support the subunit 32.

In the case of the present embodiment, the second support member 36 swingably supports the subunit 32 via two leaf spring members 38. The leaf spring members 38 are made of a deformable elastic material. For example, the leaf spring members 38 are produced by pressing a metal sheet.

As illustrated in FIG. 6, the two leaf spring members 38 are disposed at an interval in an extending direction of the first swing center line CL1 (X-axis direction) as viewed from above (as viewed in the Z-axis direction). As viewed from above, the subunit 32 is disposed between the two leaf spring members 38. Each of the leaf spring members 38 includes: a first fixed portion 38*a* fixed to the first support member 34 of the subunit 32; a second fixed portion 38*b* fixed to the second support member 36; and a coupling portion 38*c* that couples the first fixed portion 38*a* and the second fixed portion 38*b* and is deformable and elongated. The first fixed portion 38*a* and the second fixed portion 38*b* face each other at an interval in the extending direction of the first swing center line CL1 (X-axis direction), and the coupling portion 38*c* coupling the first fixed portion 38*a* and the second fixed portion 38*b* extends on the first swing center line CL1.

When the coupling portion 38*c* of each of the leaf spring member 38 is elastically deformed in a twisting manner, the subunit 32 swings in the second support member 36 and swings about the first swing center line CL1. Furthermore, when the optical path changing device 20 is in the stopped state, the optical member 22 in the subunit 32 is maintained to be in the reference orientation by the leaf spring members 38.

As illustrated in FIGS. 4 and 5, the main unit 24 is supported by the base member 26 to be swingable about the second swing center line CL2. In the case of the present embodiment, the second support member 36 of the main unit 24 is supported by the base member 26 via two leaf spring members 40. The leaf spring members 40 are made of a deformable elastic material. For example, the leaf spring members 40 are produced by pressing a metal sheet.

As illustrated in FIG. 4, the two leaf spring members 40 are disposed at an interval in an extending direction of the second swing center line CL2 (Y-axis direction) as viewed from above (as viewed in the Z-axis direction). As viewed from above, the main unit 24 is disposed between the two leaf spring members 40. Each of the leaf spring members 40 includes: a first fixed portion 40*a* fixed to the second support member 36 of the main unit 24; a second fixed portion 40*b* fixed to the base member 26; and a coupling portion 40*c* that couples the first fixed portion 40*a* and the second fixed portion 40*b* and is deformable and elongated. The first fixed portion 40*a* and the second fixed portion 40*b* face each other at an interval in the extending direction of the second swing center line CL2 (Y-axis direction), and the coupling portion 40*c* coupling the first fixed portion 40*a* and the second fixed portion 40*b* extends on the second swing center line CL2.

When the coupling portion 40*c* of each of the leaf spring members 40 is elastically deformed in a twisting manner, the main unit 24 swings above the base member 26 and swings about the second swing center line CL2. Furthermore, when the optical path changing device 20 is in the stopped state, the optical member 22 in the main unit 24 is maintained to be in the reference orientation by the leaf spring members 40.

As illustrated in FIGS. 3 and 4, the optical path changing device 20 includes: a first actuator 42 that causes the subunit 32 to swing about the first swing center line CL1; and a second actuator 44 that causes the main unit 24 to swing about the second swing center line CL2. As illustrated in FIG. 4, the first actuator 42 is disposed on one side with respect to the first swing center line CL1 as viewed in the extending direction of the optical axis LA (Z-axis direction). In the case of the present embodiment, the first actuator 42 is accommodated in the through-hole 36*a* of the second support member 36. Furthermore, the second actuator 44 is disposed on one side with respect to the second swing center line CL2 as viewed in the extending direction of the optical axis LA.

Figure 8:
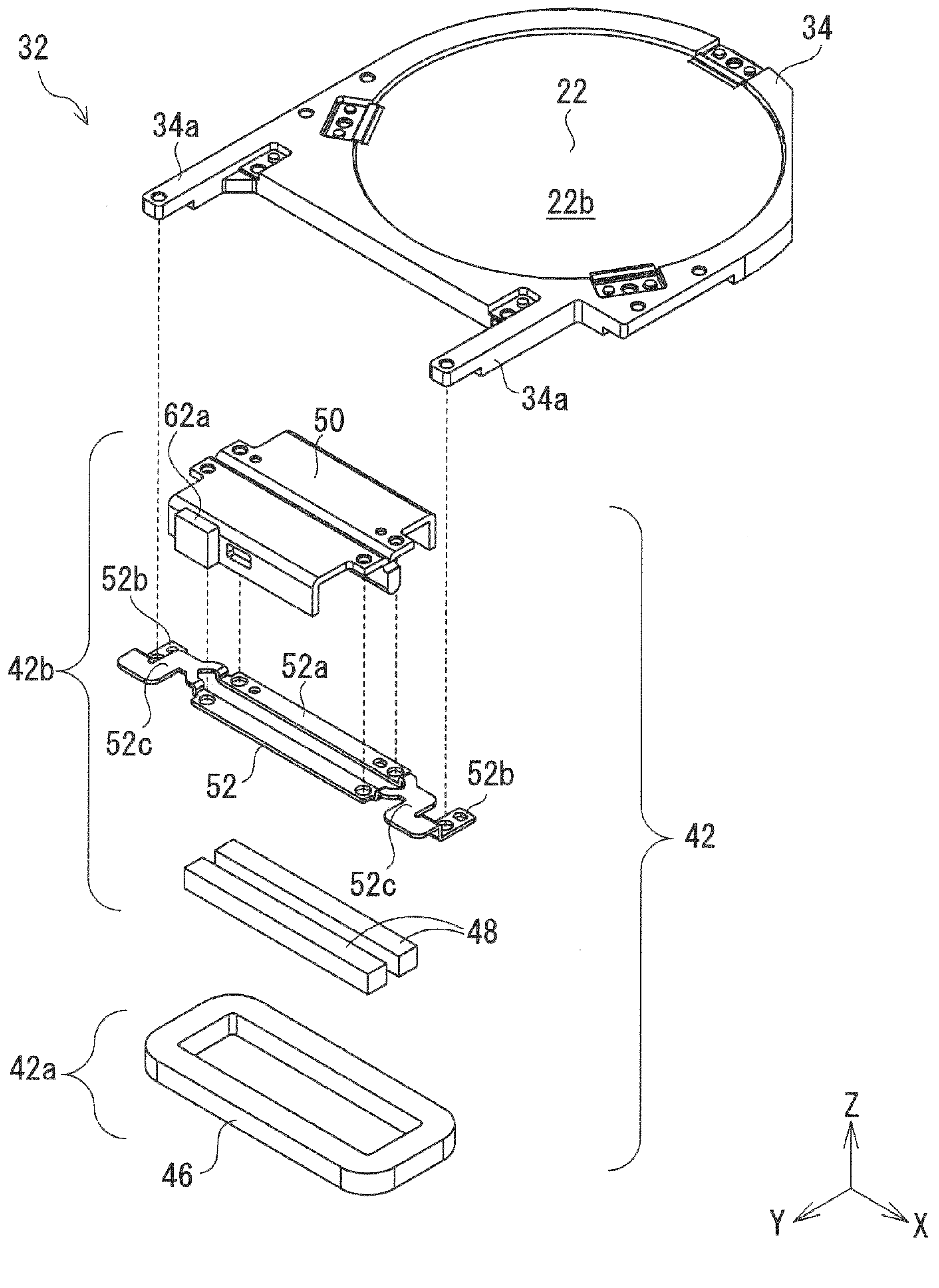
FIG. 8 is an exploded perspective view of a first actuator.
Figure 9:
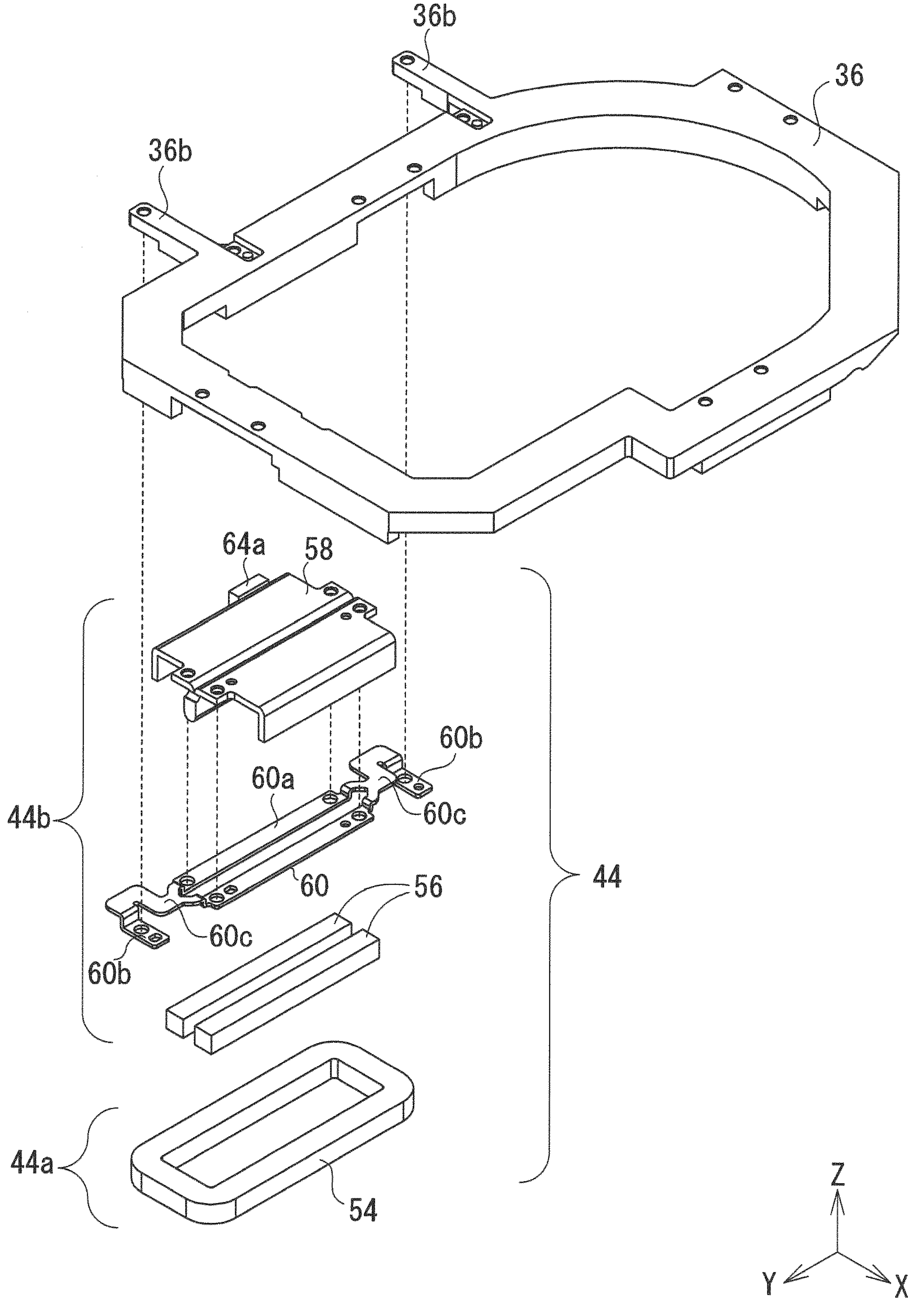
FIG. 9 is an exploded perspective view of a second actuator.

FIG. 8 is an exploded perspective view of the first actuator. Furthermore, FIG. 9 is an exploded perspective view of the second actuator. In addition, FIG. 10 is a cross-sectional view of the first and second actuators.

As illustrated in FIG. 8, the first actuator 42 is a voice coil type actuator, and includes a coil 46, movable magnets 48, a yoke 50, and an attachment member 52.

The coil 46 is included in a fixed portion 42*a* of the first actuator 42, and is fixed to the base member 26 as illustrated in FIG. 5. In addition, the coil 46 is open in the extending direction of the optical axis LA (Z-axis direction). Furthermore, the coil 46 receives an alternating current supplied from, for example, a circuit (not illustrated) on the flexible printed circuit board 28 and generates an alternating magnetic field that drives the movable magnets 48.

Figure 10:
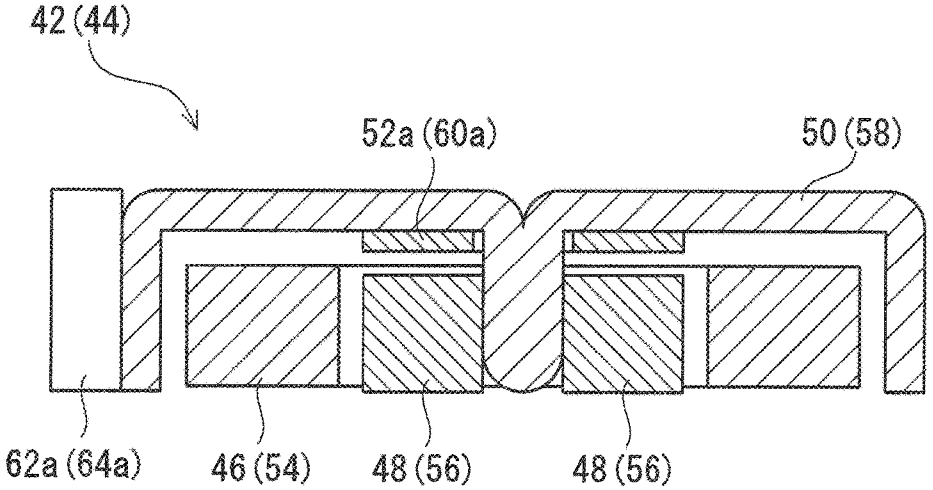
FIG. 10 is a cross-sectional view of the first and second actuators.

As illustrated in FIG. 10, the movable magnets 48 are attached to yoke 50 and disposed in the coil 46. The movable magnets 48 and yoke 50 are included in a movable portion 42*b* of the first actuator 42. When the coil 46 generates an alternating magnetic field, the movable portion 42*b* reciprocates substantially in the extending direction of the optical axis LA (Z-axis direction). Note that the movable portion 42*b* is not accurately guided to reciprocate in the extending direction of the optical axis LA.

The attachment member 52 is a member that couples the movable portion 42*b* of the first actuator 42 and the first support member 34 of the subunit 32 and is elastically deformable. For example, the attachment member 52 is a leaf spring produced by pressing a metal sheet.

As illustrated in FIG. 8, the attachment member 52 includes: a first fixed portion 52*a* provided at a center portion and fixed to the yoke 50; second fixed portions 52*b* provided at end portions and attached to the first support member 34; and coupling portions 52*c* that couple the first fixed portion 52*a* and the second fixed portions 52*b* and are deformable. The first support member 34 includes a pair of arm portions 34*a* that are provided at an interval in the extending direction of the first swing center line CL1 (X-axis direction) and each protrude in the extending direction of the second swing center line CL2 (Y-axis direction). The second fixed portions 52*b* of the attachment member 52 are each fixed to one of the arm portions 34*a*. As a result, the movable portion 42*b* of the first actuator 42 is disposed between the arm portions 34*a*.

With the above-described first actuator 42, when the coil 46 generates an alternating magnetic field, the movable portion 42*b* of the first actuator 42 reciprocates substantially in the extending direction of the optical axis LA (Z-axis direction). The reciprocation of the movable portion 42*b* causes the subunit 32 to swing about the first swing center line CL1. As a result, the optical member 22 swings about the first swing center line CL1.

As illustrated in FIG. 9, the second actuator 44 is a voice coil type actuator and includes, similarly to the first actuator 42, a coil 54, movable magnets 56, a yoke 58, and an attachment member 60.

In the case of the present embodiment, the coil 54, the movable magnets 56, and the yoke 58 of the second actuator 44 are substantially identical to the coil 46, the movable magnets 48, and the yoke 50 of the first actuator 42. The coil 54 is included in a fixed portion 44*a* of the second actuator 44, and the movable magnets 56 and the yoke 58 are included in the movable portion 44*b*.

The attachment member 60 couples the movable portion 44*b* of the second actuator 44 and the second support member 36 of the main unit 24 and is produced of an elastic material. For example, the attachment member 60 is produced by pressing a metal sheet.

As illustrated in FIG. 9, the attachment member 60 includes: a first fixed portion 60*a* provided at a center portion and fixed to the yoke 58; second fixed portions 60*b* provided at end portions and attached to the second support member 36; and coupling portions 60*c* that couple the first fixed portion 60*a* and the second fixed portions 60*b* and are deformable. The second support member 36 includes a pair of arm portions 36*b* that are provided at an interval in the extending direction of the second swing center line CL2 (Y-axis direction) and each protrude in the extending direction of the first swing center line CL1 (X-axis direction). The second fixed portions 60*b* of the attachment member 60 are each fixed to one of the arm portions 36*b*. As a result, the movable portion 44*b* of the second actuator 44 is disposed between the arm portions 36*b*.

With the above-described second actuator 44, when the coil 54 generates an alternating magnetic field, the movable portion 44*b* of the second actuator 44 reciprocates in the extending direction of the optical axis LA (Z-axis direction). The reciprocation of the movable portion 44*b* causes the main unit 24 to swing about the second swing center line CL2. As a result, the optical member 22 swings about the second swing center line CL2.

Furthermore, in the case of the present embodiment, as illustrated in FIG. 4, the optical path changing device 20 includes a first position sensor 62 for detecting a position of the movable portion 42*b* of the first actuator 42 and a second position sensor 64 for detecting a position of the movable portion 44*b* of the second actuator 44.

In the case of the present embodiment, the first and second position sensors 62 and 64 are so-called Hall sensors. The first and second position sensors 62 and 64 include position detecting magnets 62*a* and 64*a* and sensing chips (magnetic field detectors) 62*b* and 64*b* that detect magnetic fields generated from the position detecting magnets 62*a* and 64*a*. The position detecting magnets 62*a* and 64*a* are attached to the yokes 50 and 58 of the movable portions 42*b* and 44*b* of the first and second actuators 42 and 44. The sensing chips 62*b* and 64*b* are mounted on the flexible printed circuit board 28 and are fixed to the base member 26. The first and second position sensors 62 and 64 detect the positions of the movable portions 42*b* and 44*b* of the first and second actuators 42 and 44 (positions in the extending direction of the optical axis LA (Z-axis direction)) on the basis of changes in the magnetic fields detected by the sensing chips 62*b* and 64*b*. On the basis of detection results of the first and second position sensors 62 and 64, a processor (not illustrated) such as a microprocessor unit (MPU) of the optical path changing device 20 mounted on the flexible printed circuit board 28 controls the alternating current supplied to the coils 46 and 54 of the first and second actuators 42 and 44.

The configuration of the optical path changing device 20 has been described so far. Hereinafter, some additional features of the optical path changing device 20 according to the present embodiment will be described.

First, as illustrated in FIG. 6, the first support member 34 of the subunit 32 and the movable portion 42*b* of the first actuator 42 are not directly connected, but are coupled via the attachment member 52. In addition, the second support member 36 of the main unit 24 and the movable portion 44*b* of the second actuator 44 are not directly connected, but are coupled via the attachment member 60. Furthermore, since the attachment members 52 and 60 are produced of an elastic material, the two coupling portions 52*c* and 60*c* of the attachment members 52 and 60 are elastically deformed. In other words, the first support member 34 and the movable portion 42*b* of the first actuator 42 are coupled via a plurality of elastic members (first elastic members), and the second support member 36 and the movable portion 44*b* of the second actuator 44 are coupled via a plurality of elastic members (second elastic members). The coupling via elastic members as described above can provide the following effects.

Figure 11:
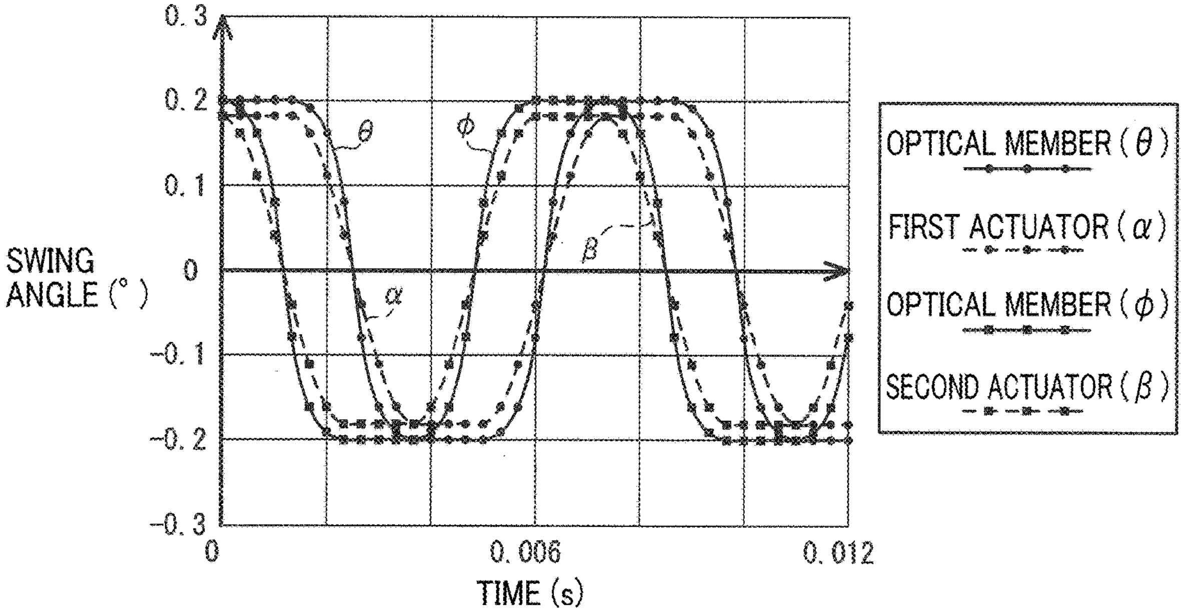
FIG. 11 is a diagram illustrating changes in swing angles of the optical member and the first and second actuators.

FIG. 11 is a diagram illustrating changes in swing angles of the optical member and the first and second actuators.

As illustrated in FIG. 2, a swing angle θ is the swing angle of the optical member 22 that swings about the first swing center line CL1. Furthermore, a swing angle q is the swing angle of the optical member 22 that swings about the second swing center line CL2. Note that when the optical member 22 is in the reference orientation, each of the swing angles θ and φ is 0 degrees.

In the case of the present embodiment, the first and second actuators 42 and 44 do not swing. However, swing angles α and β of the first and second actuators 42 and 44 can be defined as the following Mathematical Equations 1 and 2.

[Mathematical Expression 1]

$$\alpha = \tan^{-1}\left(\frac{d1}{L1}\right) \quad \text{(Formula 1)}$$

[Mathematical Expression 2]

$$\beta = \tan^{-1}\left(\frac{d2}{L2}\right) \quad \text{(Formula 2)}$$

In Mathematical Equation 1, L1 is a distance between the first swing center line CL1 and the movable portion 42*b* of the first actuator 42. Note that L1 is a distance when the optical member 22 is in the reference orientation. The variable d1 is a displacement amount of the first actuator 42 of the movable portion 42*b* in the extending direction of the optical axis LA (Z-axis direction). Note that when the optical member 22 is in the reference orientation, the displacement amount d1 is 0.

In Mathematical Equation 2, L2 is a distance between the second swing center line CL2 and the movable portion 44*b* of the second actuator 44. Note that L2 is a distance when the optical member 22 is in the reference orientation. The variable d2 is a displacement amount of the second actuator 44 of the movable portion 44*b* in the extending direction of the optical axis LA (Z-axis direction). Note that when the optical member 22 is in the reference orientation, the displacement amount d2 is 0.

As illustrated in FIG. 11, when the movable portion 42*b* of the first actuator 42 swings at a maximum of the swing angle α (is displaced by a maximum of the displacement amount d1) with respect to the first swing center line CL1, the optical member 22 swings at the swing angle θ that is larger than the maximum of the swing angle α. In a similar manner, when the movable portion 44*b* of the second actuator 44 swings at a maximum of the swing angle β (is displaced by a maximum of the displacement amount d2) with respect to the second swing center line CL2, the optical member 22 swings at the swing angle φ that is larger than the maximum of the swing angle β.

Such a behavior is caused by elastic deformations of the coupling portions 52*c* and 60*c* of the attachment members 52 and 60. Specifically, when the displacement directions of the movable portions 42*b* and 44*b* of the first and second actuators 42 and 44 are reversed, the coupling portions 52*c* and 60*c* are elastically deformed by inertial forces, so that the displacement direction of the optical member 22 is reversed with delay. Further, due to the elastic deformations of the coupling portions 52*c* and 60*c*, the maximums of the swing angles θ and φ of the optical member 22 are larger than the maximums of the swing angles α and β of the first and second actuators 42 and 44. That is, amplitudes of the swing angles θ and φ of the optical member 22 are larger than amplitudes of the swing angles α and β of the first and second actuators 42 and 44.

Furthermore, due to the elastic deformations of the coupling portions 52*c* and 60*c* of the attachment members 52 and 60, restoring forces are generated in the coupling portions 52*c* and 60*c* of the attachment members 52 and 60. Due to the restoring forces, with respect to a speed from 0 to a peak and a speed from the peak to 0, the swing angles θ and φ of the optical member 22 have faster speeds than the swing angles α and β of the first and second actuators 42 and 44. As a result, even though the amplitudes are different, frequencies of the swing angles θ and φ of the optical member 22 substantially coincide with frequencies of the swing angles α and β of the first and second actuators 42 and 44.

When the optical member 22 is driven by the first and second actuators 42 and 44 as described above, a small displacement amount of the movable portions 42*b* and 44*b* of the first and second actuators 42 and 44 can drive the optical member 22 with a large displacement amount. That is, when the optical member 22 is driven with the swing amount and the swing speed necessary for high resolution of the image M on the screen S, the displacement amount and the displacement speed of the movable portions 42*b* and 44*b* of the first and second actuators 42 and 44 can be smaller (compared with the case where the movable portions 42*b* and 44*b* of the first and second actuators 42 and 44 are directly connected to the first and second support members 34 and 36 without using the attachment members 52 and 60). As a result, it is possible to reduce a level of a noise generated from the first and second actuators 42 and 44 when the optical member 22 is driven.

Furthermore, as illustrated in FIG. 6, in the case of the present embodiment, the first support member 34 and the movable portion 42*b* of the first actuator 42 are preferably coupled to each other at a plurality of places. Specifically, the first support member 34 and the first actuator 42 are coupled via the two coupling portions 52*c* of the attachment member 52. Furthermore, the two coupling portions 52*c* are disposed at an interval in the extending direction of the first swing center line CL1 (X-axis direction). As a result, the subunit 32 can swing uniformly over the entire extending direction of the first swing center line CL1. In contrast, in a case where only one coupling portion 52*c* is used, an orientation of the movable portion 42*b* of the first actuator 42 is not stable, and the movable portion 42*b* of the first actuator 42 easily tilts, so that there is a possibility that the resolution of the image M on the screen S cannot be appropriately increased due to the tilt.

Furthermore, it is preferable that an extending length of the coupling portion 52*c* (first elastic member) of the attachment member 52 be larger than a distance between a portion, of the first support member 34, connected to the coupling portion 52*c* and a portion, of the first actuator 42, connected to the coupling portion 52*c*. Therefore, the coupling portions 52*c* extend in a meandering manner. That is, the coupling portions 52*c* do not couple the first support member 34 and the first actuator 42 at the shortest distance. In contrast, when the coupling portion 52*c* couples the first support member 34 and the first actuator 42 at the shortest distance, the coupling portions 52*c* cannot be elastically deformed with a sufficient deformation amount. In this case, the following effect is small. As illustrated in FIG. 11, when the movable portion 42*b* of the first actuator 42 swings at a maximum of the swing angle α (is displaced by a maximum of the displacement amount d1), the optical member 22 swings at the swing angle θ larger than the maximum of the displacement angle α. Therefore, a reduction amount in the level of the noise generated from the first actuator 42 is small. Therefore, since the coupling portions 52*c* of the attachment member 52 have an extending length larger than the distance between the first support member 34 and the first actuator 42, it is possible to sufficiently reduce the level of the noise generated from the first actuator 42.

In a similar manner, as illustrated in FIG. 6, the second support member 36 and the movable portion 44*b* of the second actuator 44 are also coupled to each other at a plurality of places. That is, the second support member 36 and the second actuator 44 are coupled via the two coupling portions 60*c* of the attachment member 60. Furthermore, the two coupling portions 60*c* are disposed at an interval in the extending direction of the second swing center line CL2 (Y-axis direction). As a result, the main unit 24 can swing uniformly over the entire extending direction of the second swing center line CL2.

Furthermore, in a similar manner, it is preferable that an extending length of the coupling portion 60*c* (second elastic member) of the attachment member 60 also be larger than a distance between a portion, of the second support member 36, connected to the coupling portion 60*c* and a portion, of the second actuator 44, connected to the coupling portion 60*c*. Specifically, the coupling portions 60*c* extend in a meandering manner. As a result, it is possible to sufficiently reduce the level of the noise generated from the second actuator 44.

In addition, as illustrated in FIGS. 4 and 6, the first and second swing center lines CL1 and CL2 are shifted from the shape center P0 of the optical member 22. Specifically, as viewed in the extending direction of the optical axis LA (Z-axis direction), the first swing center line CL1 is shifted toward the first actuator 42, and the second swing center line CL2 is shifted toward the second actuator 44. As a result, the first swing center line CL1 is close to the first actuator 42, and the second swing center line CL2 is close the second actuator 44. With this arrangement, necessary displacement amounts of the movable portions 42*b* and 44*b* of the first and second actuators 42 and 44 can be reduced, as compared with the case where the first and second swing center lines CL1 and CL2 overlap the shape center P0 of the optical member 22 as viewed in the extending direction of the optical axis LA. As a result, it is possible to reduce the level of the noise generated from the first and second actuators 42 and 44.

Note that at least one of the first and second swing center lines CL1 and CL2 may overlap the shape center P0 of the optical member 22 as viewed in the extending direction of the optical axis LA (Z-axis direction).

Furthermore, as illustrated in FIGS. 4 and 6, the first swing center line CL1 is preferably closer to a centroid G1 of the subunit 32 than to the shape center P0 of the optical member 22. It is more preferable that the first swing center line CL1 overlap the centroid G1 of the subunit 32 as viewed in the extending direction of the optical axis LA (Z-axis direction). With this arrangement, the first actuator 42 can swing the subunit 32 about the first swing center line CL1 with a smaller force. In the case of the present embodiment, electric power supplied to the coil 46 of the first actuator 42 can be made low.

In the similar manner, the second swing center line CL2 is preferably closer to the centroid G2 of the main unit 24 than to the shape center P0 of the optical member 22. It is more preferable that the second swing center line CL2 overlap the centroid G2 of the main unit 24 as viewed in the extending direction of the optical axis LA (Z-axis direction). With this arrangement, the second actuator 44 can swing the main unit 24 about the second swing center line CL2 with a smaller force.

Further additionally, in the case of the present embodiment, as illustrated in FIG. 4, the position detecting magnet 62*a* of the first position sensor 62 is located on the second swing center line CL2. With such an arrangement, even when the main unit 24 swings about the second swing center line CL2, the position of the position detecting magnet 62*a* does not substantially change. As a result, the sensing chip 62*b* of the first position sensor 62 can detect only a displacement of the position detecting magnet 62*a*, in the extending direction of the optical axis LA (Z-axis direction), caused by the swing of the subunit 32 about the first swing center line CL1. As a result, the first position sensor 62 can detect the position of the movable portion 42*b* of the first actuator 42 with high accuracy.

With the embodiment as described above, in the optical path changing device 20 of the projection image display device 10, it is possible to reduce the level of the noise generated when the orientation of the optical member 22 is changed.

Specifically, first, since the orientation of the optical member 22 is changed by a minimum number of actuators (first and second actuators 42 and 44), the level of the noise derived from the actuators is reduced. Furthermore, as described above and illustrated in FIG. 4, the first and second swing center lines CL1 and CL2 are shifted from the shape center P0 of the optical member 22 toward the first and second actuators 42 and 44, and this arrangement also reduces the level of the noise derived from the actuators.

Although the present disclosure has been described with reference to the above-described embodiment, the embodiment of the present disclosure is not limited to the above-described embodiment.

For example, in the case of the above-described embodiment, as illustrated in FIGS. 8 and 9, the first and second actuators 42 and 44 are so-called voice coil type actuators. However, the embodiment of the present disclosure is not limited thereto. The first and second actuators may be electromagnets.

Regarding the first and second actuators 42 and 44, in the case of the above-described embodiment, the coil 46 and the coil 54 of the first and second actuators 42 and 44 generate alternating magnetic fields by receiving a supply of alternating currents. However, the embodiment of the present disclosure is not limited thereto. The coils may intermittently generate magnetic fields by intermittently receiving supply of direct currents.

Regarding the first and second actuators 42 and 44, in the case of the above-described embodiment, the attachment members 52 and 60 of the first and second actuators 42 and 44 are elastically deformable leaf springs. However, the embodiment of the present disclosure is not limited thereto. The attachment members may be, for example, compression coil springs. That is, in the present disclosure, as long as the attachment member is a member that can be repeatedly elastically deformed, there is no limitation in materials or shapes of the attachment members.

Regarding the first and second actuators 42 and 44, in the case of the above-described embodiment, the fixed portions 42*a* and 44*a* of the first and second actuators 42 and 44 include the coils 46 and 54, and the movable portions 42*b* and 44*b* include the movable magnets 48 and 56 and the yokes 50 and 58. However, the present embodiment is not limited thereto. The movable portions of the first and second actuators may include a coil, and the fixed portions may include a magnet and a yoke. In this case, it is necessary to use a flexible cable to supply currents to the moving coils.

Furthermore, in the case of the above-described embodiment, as illustrated in FIG. 2, the incident surface 22*a* and the emission surface 22*b* of the optical member 22 of the optical path changing device 20 are flat surfaces parallel to each other. However, the embodiment of the present disclosure is not limited thereto. The optical member 22 may be, for example, a lens.

Furthermore, in the case of the above-described embodiment, the first support member 34 and the first actuator 42 are coupled via the elastically deformable attachment member 52. In addition, the second support member 36 and the second actuator 44 are coupled via the elastically deformable attachment member 60. However, the embodiment of the present disclosure is not limited thereto. The first support member 34 and the first actuator 42 may be directly connected, or the second support member 36 and the second actuator 44 may be directly connected.

Furthermore, in the case of the above-described embodiment, as illustrated in FIG. 2, the optical member 22 is made to swing about the different first and second swing center lines CL1 and CL2. However, the embodiment of the present disclosure is not limited thereto.

Figure 12:
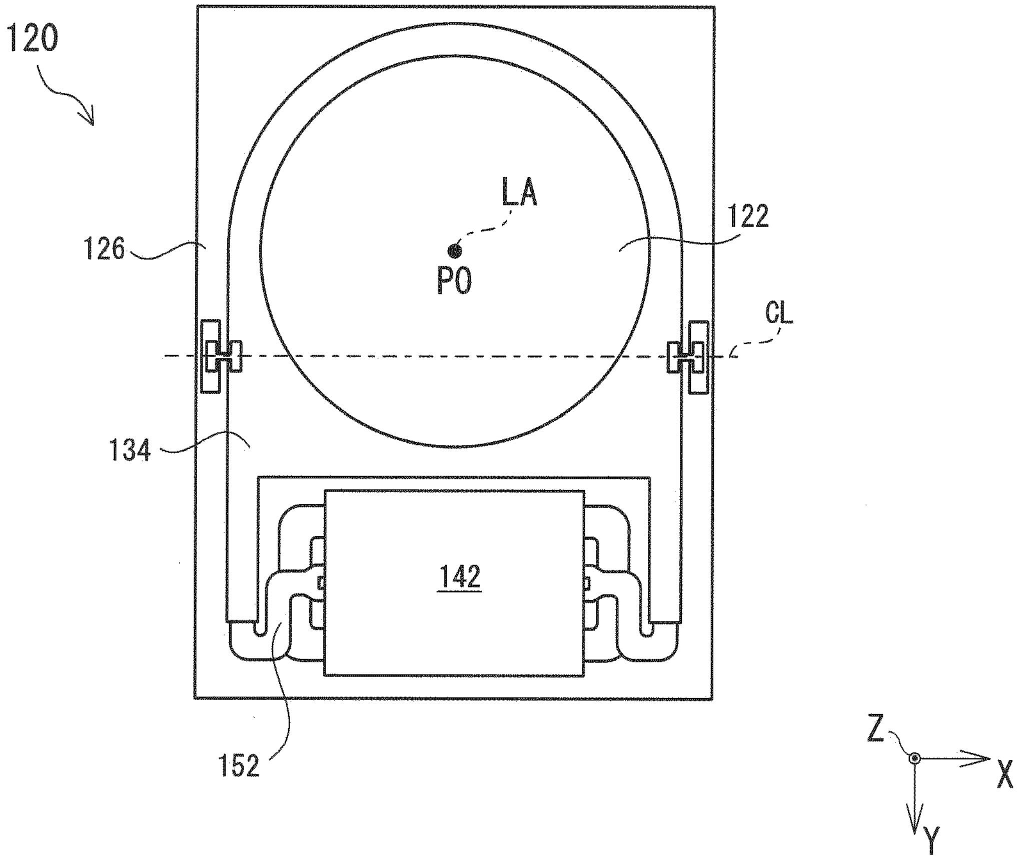
FIG. 12 is a schematic top view of an optical path changing device according to another embodiment.

FIG. 12 is a schematic top view of an optical path changing device according to another embodiment.

As illustrated in FIG. 12, an optical path changing device 120 according to another embodiment includes a support member 134 that supports an optical member 122. The support member 134 is supported by a base member 126 to be swingable about a swing center line CL. Furthermore, the support member 134 is coupled to an actuator 142 via an attachment member 152 made of an elastic material. Furthermore, the swing center line CL is shifted toward the actuator 142 with respect to the shape center P0 of the optical member 22 as viewed in an extending direction of an optical axis LA (Z-axis direction).

The optical path changing device 120 of another embodiment as described above can also increase the resolution of the image shown on the screen.

That is, an embodiment of the present disclosure is, in a broad sense, an optical path changing device including: an optical member; a first support member that supports the optical member; a second support member that supports the first support member swingably about a first swing center line extending in a direction intersecting a propagation direction of light incident on the optical member; a base member that supports the second support member swingably about a second swing center line that extends in a direction intersecting the propagation direction and is different from the first swing center line; a first actuator that is disposed on one side with respect to the first swing center line as viewed in the propagation direction and swings the first support member; and a second actuator that is disposed on one side with respect to the second swing center line as viewed in the propagation direction and swings the second support member, wherein as viewed in the propagation direction, the first swing center line is shifted toward the first actuator with respect to a shape center of the optical member at between the shape center of the optical member and the first actuator, or as viewed in the propagation direction, the second swing center line is shifted toward the second actuator with respect to the shape center of the optical member at between the shape center of the optical member and the second actuator.

Further, another embodiment of the present disclosure is, in a broad sense, an optical path changing device including: an optical member; a support member that supports the optical member; a base member that supports the support member swingably about a swing center line that extends in a direction intersecting a propagation direction of light incident on the optical member; and an actuator that is disposed on one side with respect to the swing center line as viewed in the propagation direction and swings the support member, wherein as viewed in the propagation direction, the swing center line is shifted toward the actuator with respect to a shape center of the optical member at between the shape center of the optical member and the actuator.

Furthermore, a different embodiment of the present disclosure is, in a broad sense, a projection image display device including: the above-described optical path changing device; a light source; and an optical modulation module that converts light from the light source into image light and emits the image light toward the optical member of the optical path changing device.

As described above, the above-described embodiments have been described as examples of techniques in the present disclosure. For that purpose, the drawings and the detailed descriptions are provided. Therefore, the components illustrated in the drawings and described in the detailed descriptions can include, to exemplify the above-described techniques, not only components essential for solving the issue but also components not essential for solving the issue. For this reason, it should not be immediately recognized that those unnecessary components are necessary only because those unnecessary components are described in the drawings or the detailed descriptions.

In addition, because the above-described embodiments are for illustrating techniques in the present disclosure, various modifications, replacements, additions, removals, or the like can be made without departing from the scope of the claims or the equivalent thereto.

The present disclosure is applicable to a device in which an orientation of an optical member needs to be changed.

What is claimed is:

1. An optical path changing device comprising:

an optical member;

a first support member that supports the optical member;

a second support member that supports the first support member swingably about a first swing center line extending in a direction intersecting a propagation direction of light incident on the optical member;

a base member that supports the second support member swingably about a second swing center line that extends in a direction intersecting the propagation direction and is different from the first swing center line;

a first actuator that is disposed on one side with respect to the first swing center line as viewed in the propagation direction and swings the first support member; and a second actuator that is disposed on one side with respect to the second swing center line as viewed in the propagation direction and swings the second support member, wherein as viewed in the propagation direction, the first swing center line is shifted toward the first actuator with respect to a shape center of the optical member at between the shape center of the optical member and the first actuator, or as viewed in the propagation direction, the second swing center line is shifted toward the second actuator with respect to the shape center of the optical member at between the shape center of the optical member and the second actuator.

2. The optical path changing device according to claim 1, wherein, as viewed in the propagation direction, the first swing center line is shifted toward the first actuator with respect to the shape center of the optical member, and the second swing center line is shifted toward the second actuator with respect to the shape center of the optical member.

3. The optical path changing device according to claim 1, wherein a subunit is configured with a member that includes at least the optical member and the first support member and swings about the first swing center line, and the first swing center line is closer to a centroid of the subunit than to the shape center of the optical member.

4. The optical path changing device according to claim 3, wherein a main unit is configured with a member that includes at least the subunit and the second support member and swings about the second swing center line, and the second swing center line is closer to a centroid of the main unit than to the shape center of the optical member.

5. The optical path changing device according to claim 1, wherein the first actuator includes:

a movable portion that includes a movable magnet and is coupled to the first support member; and a fixed portion that includes a coil that generates a magnetic field and is fixed to the base member, and the second actuator includes:

a movable portion that includes a movable magnet and is coupled to the second support member; and a fixed portion that includes a coil that generates a magnetic field and is fixed to the base member.

6. The optical path changing device according to claim 5, further comprising a position detecting sensor including:

a position detecting magnet attached to the movable portion of the first actuator; and a magnetic field detector fixed to the base member, wherein the position detecting magnet of the position detecting sensor is disposed on the second swing center line.

7. The optical path changing device according to claim 1, wherein the first actuator includes a first movable portion making a move to swing the first support member, and the second actuator includes a second movable portion making a move to swing the second support member.

8. The optical changing device according to claim 1, further comprising:

a first attachment member coupling the first support member and the first actuator; and a second attachment member coupling the second support member and the second actuator.

9. A projection image display device comprising:

the optical path changing device according to claim 1;

a light source; and an optical modulation module that converts light from the light source into image light and emits the image light toward the optical member of the optical path changing device.

10. An optical path changing device comprising:

an optical member;

a support member that supports the optical member;

a base member that supports the support member swingably about a swing center line that extends in a direction intersecting a propagation direction of light incident on the optical member; and an actuator that is disposed on one side with respect to the swing center line as viewed in the propagation direction and swings the support member, wherein as viewed in the propagation direction, the swing center line is shifted toward the actuator with respect to a shape center of the optical member at between the shape center of the optical member and the actuator.

11. A projection image display device comprising:

the optical path changing device according to claim 10;

a light source; and an optical modulation module that converts light from the light source into image light and emits the image light toward the optical member of the optical path changing device.

* * * * *